O. A. DAVIS.
BEE-HIVE.
No. 179,687. Patented July 11, 1876.
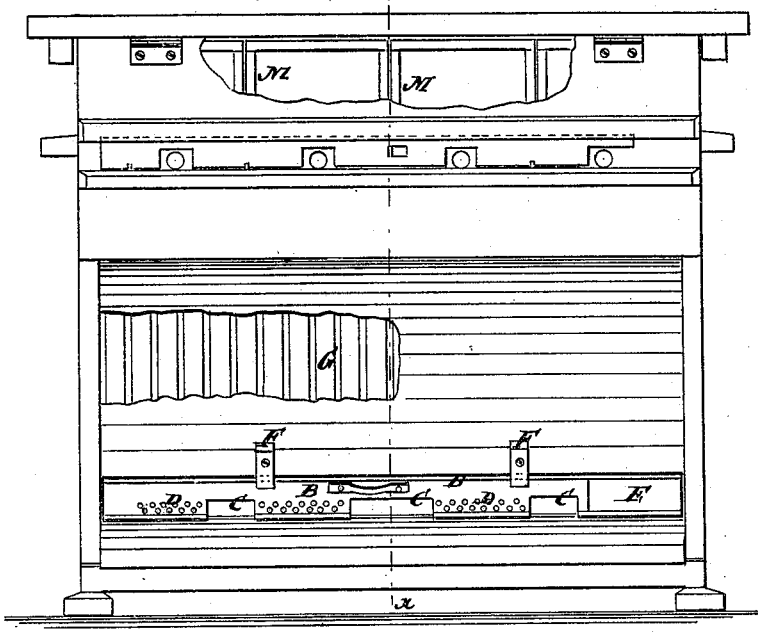
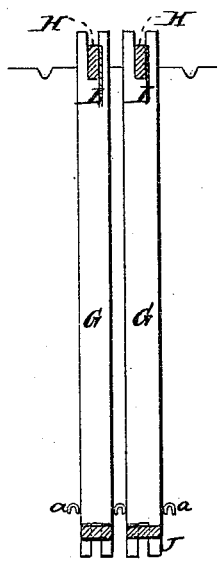
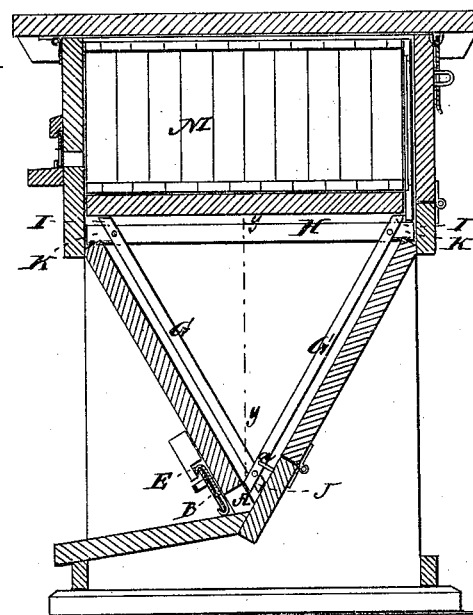
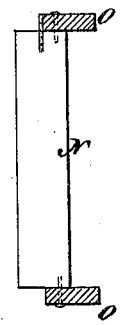
WITNESSES:
E. Wolff
John Goethals
INVENTOR:
O. A. Davis
BY
ATTORNEYS.

UNITED STATES PATENT OFFICE.

ORSON A. DAVIS, OF SACRAMENTO, CALIFORNIA.

IMPROVEMENT IN BEE-HIVES.

Specification forming part of Letters Patent No. 179,687, dated July 11, 1876; application filed May 1, 1876.

*To all whom it may concern:*

Be it known that I, ORSON A. DAVIS, of Sacramento, in the county of Sacramento and State of California, have invented a new and Improved Bee-Hive, of which the following is a specification:

My invention consists, first, of an adjustable entrance-gage to regulate the size of the passage to suit the wants of the colony, having perforations to admit air for ventilation when the passages are closed, and so contrived that it can be readily taken away when it is desired to clean the dirt out through the passage; second, of the construction of the boxes for surplus honey in sections, adapted to be separated with the divisions of the comb, and constructed so that the upper joints serve for comb-guides, by which the divisions of the comb will coincide with the divisions of the boxes.

Figure 1 is a front elevation of my improved bee-hive, with some parts broken out. Fig. 2 is a transverse section on the line $x\,x$ of Fig. 1. Fig. 3 is a detail section on line $y\,y$, Fig. 2. Fig. 4 is a horizontal section of one of the sections of the surplus-honey box.

A represents the passage, with which there is a slide, B, having notches C, to regulate the width to the requirements of the colony, and for retaining the queen when desired, and the parts D, which close the passages, are perforated to admit air for ventilation. This slide is fixed in a guideway, E, which is held detachable to its place by buttons F, by which the passages can be more freely opened to clean the dirt out of the hive, which, owing to the form of the hive, drops down and collects in the angle into which the passages open. The lower comb-frames consist of two side bars, G, and a top bar, H, which are connected together by notching the top bar edgewise into the upper ends of the said bars, and notching the lower ends of the two sides together, so that the upper ends I of the side bars form rests for the honey-board, the lower ends J separate the frame from the sides of the chambers, and the top bar suspends the frame by its projecting ends K resting on the upper edges of the sides of the chamber. The wire staples $a$ keep the comb-frames apart at the lower ends. The bars H are made thinner than the side bars, so that their sides are accessible to the bars to enable them to utilize the lower corner for comb-guides, and they allow of attaching a wax-guide, L, if desired. The upper honey-boxes M I propose to make in sections of suitable width to separate with the divisions of the comb, as represented in Fig. 4; and, in order to afford a comb-guide in the middle of each frame, I attach the upper and lower cross-bars N so that they join each other in the middle of the side bars O, this locating the line of the joint in the proper place for the comb-guide.

Having thus described my invention, what I claim as new, and desire to secure by Letters Patent, is—

1. The regulating-slide B for the passages A, having notches C and perforated sections D, and arranged in the detachable way E, substantially as specified.

2. The extensions I of the lower comb-frames supporting the honey-board, substantially as specified.

3. The extensions J of the lower comb-frames, in combination with the sides of the lower chamber, substantially as specified.

4. The surplus-honey box, constructed in sections, of which the upper and lower cross-bars join in the middle of the side bars, substantially as specified.

ORSON A. DAVIS.

Witnesses:
 R. D. MCCARTHY,
 SAMUEL CROSS.